(12) United States Patent
Hultén et al.

(10) Patent No.: US 9,994,449 B2
(45) Date of Patent: Jun. 12, 2018

(54) PROCESS FOR THE PRODUCTION OF CHLORINE DIOXIDE

(75) Inventors: Felix Karl Torsten Hultén, Västra Frölunda (SE); Karolina Ellen Therese Appelqvist Albinsson, Mölnlycke (SE); Kalle Hans Thomas Pelin, Ytterby (SE)

(73) Assignee: AKZO NOBEL CHEMICALS INTERNATIONAL B.V., Arnhem (NL)

( * ) Notice: Subject to any disclaimer, the term of this patent is extended or adjusted under 35 U.S.C. 154(b) by 79 days.

(21) Appl. No.: 13/122,533

(22) PCT Filed: Oct. 2, 2009

(86) PCT No.: PCT/EP2009/062801
§ 371 (c)(1),
(2), (4) Date: Apr. 4, 2011

(87) PCT Pub. No.: WO2010/040687
PCT Pub. Date: Apr. 15, 2010

(65) Prior Publication Data
US 2011/0182800 A1    Jul. 28, 2011

Related U.S. Application Data

(60) Provisional application No. 61/102,950, filed on Oct. 6, 2008.

(30) Foreign Application Priority Data

Oct. 6, 2008    (EP) .................................... 08165910

(51) Int. Cl.
C01B 11/02    (2006.01)
(52) U.S. Cl.
CPC .......... C01B 11/025 (2013.01); C01B 11/023 (2013.01); C01B 11/026 (2013.01)
(58) Field of Classification Search
CPC .... C01B 11/023; C01B 11/025; C01B 11/026
USPC ................................................. 423/477, 478
See application file for complete search history.

(56) References Cited

U.S. PATENT DOCUMENTS

| | | | |
|---|---|---|---|
| 2,833,624 A | 5/1958 | Sprauer | |
| 4,129,484 A | 12/1978 | Larsson | |
| 4,534,952 A | 8/1985 | Rapson et al. | |
| 5,091,166 A | 2/1992 | Engstrom et al. | |
| 5,091,167 A | 2/1992 | Engstrom et al. | |
| 5,366,714 A | 11/1994 | Bigauskas | |
| 5,478,446 A | 12/1995 | Falgen et al. | |
| 5,487,881 A | 1/1996 | Falgen et al. | |
| 5,674,466 A | 10/1997 | Dahl et al. | |
| 5,770,171 A | 6/1998 | Sundblad et al. | |
| 5,858,322 A | 1/1999 | Gray | |
| 5,895,638 A | 4/1999 | Tenney | |
| 6,322,690 B1 | 11/2001 | Hammer-Olsen et al. | |
| 6,387,344 B1 | 5/2002 | Tenney et al. | |
| 6,585,950 B1 | 7/2003 | Dahl et al. | |
| 6,790,427 B2 | 9/2004 | Charles et al. | |
| 2003/0031621 A1 | 2/2003 | Gravitt et al. | |
| 2004/0175322 A1 | 9/2004 | Woodruff et al. | |
| 2005/0186131 A1 | 8/2005 | Charles et al. | |
| 2006/0133983 A1 | 6/2006 | Charles et al. | |
| 2007/0116637 A1 | 5/2007 | Woodruff et al. | |
| 2007/0237708 A1 | 10/2007 | Woodruff et al. | |
| 2010/0055027 A1* | 3/2010 | Pelin et al. | ................ 423/478 |

FOREIGN PATENT DOCUMENTS

| | | |
|---|---|---|
| FR | 2858605 | 2/2005 |
| JP | 1986-117102 | 6/1986 |
| JP | 88-008203 | 1/1988 |
| JP | 03-115102 | 5/1991 |
| JP | 2000-354892 | 12/2000 |
| JP | 2004-223438 | 8/2004 |
| JP | 2008-520527 | 6/2008 |
| WO | 88/08823 | 11/1988 |
| WO | 2006/033609 | 3/2006 |
| WO | 2006/062455 | 6/2006 |
| WO | 2006-068743 | 6/2006 |
| WO | 2008/085122 | 7/2008 |

OTHER PUBLICATIONS

"Chlorine Dioxide", taken from http://home.windstream.net/mikeric/Odor/clo2.htm, Jun. 2001, pp. 2-4.*
World Health Organization, "Dioxins and their effects on human health", Nov. 2007, taken from https://web.archive.org/web/20071226040523/http://www.who.int/mediacentre/factsheets/fs225/en/print.html.*
International Search Report for PCT/EP2009/062801, dated Feb. 4, 2010, 2 pages.
Dence, Carlton W., et al., "Pulp Bleaching: Principles and Practice", Section II: Raw Materials, Chapter 2: Bleaching Chemicals: Chlorine Dioxide, Tappi Press, 1996, pp. 61-69.
Office Action received in Russian Application No. 201111800/05(02676), dated Oct. 4, 2013.
The Manual for Identification and Quantification of Dioxin and Furan Release, UNEP Chemicals Branch, Edition 1, Geneva, Switzerland, 2003, p. 146, includes English-language translation.
Office Action received in Japanese Application No. 2011-530460, dated Jun. 11, 2013.
Volk et al., "Implementation of chlorine dioxide disinfection: Effects of the treatment change on drinking water quality in a full-scale distribution system", J. Environ. Eng. Sci., 2002, vol. 1, 323-330.

* cited by examiner

*Primary Examiner* — Ngoc-Yen Nguyen
(74) *Attorney, Agent, or Firm* — McDonnell Boehnen Hulbert & Berghoff LLP

(57) ABSTRACT

The invention relates to a process for the production of chlorine dioxide comprising forming chlorine dioxide in a reaction medium in a reaction vessel and withdrawing chlorine dioxide as a gas from the reaction medium in the reaction vessel, the process further comprising adding chlorine dioxide to at least one raw material used in the process. The invention further relates to the use of chlorine dioxide for the reduction of the amount of chlorinated aromatic compounds occurring in a process for the production of chlorine dioxide.

16 Claims, No Drawings

PROCESS FOR THE PRODUCTION OF CHLORINE DIOXIDE

REFERENCE TO RELATED APPLICATION(S)

This application is the U.S. National Phase of PCT/EP2009/062801 filed on Oct. 2, 2009, and claims the benefit of U.S. Provisional Application No. 61/102,950 filed on Oct. 6, 2008.

The present invention relates to a process for the production of chlorine dioxide comprising reacting chlorate ions and a reducing agent in a reaction vessel to form chlorine dioxide, the process further comprising adding chlorine dioxide to at least one raw material used in the process.

Chlorine dioxide, used in aqueous solution or as a gas, is of considerable commercial interest, mainly in pulp bleaching, but also in water purification, inhibition of microbial growth, fat bleaching, removal of phenols from industrial wastes etc. It is therefore desirable to provide processes in which chlorine dioxide can be efficiently produced.

There are numerous different processes for chlorine dioxide production. Most large scale processes in commercial use are run at pulp mills and involve continuous reaction of alkali metal chlorate in an acidic reaction medium with a reducing agent such as hydrogen peroxide, methanol, chloride ions or sulfur dioxide to form chlorine dioxide that is withdrawn as a gas from the reaction medium. An overview of such process can be found in "Pulp Bleaching—Principles and Practice", TAPPI PRESS 1996, Section II: Raw Materials, Chapter 2: Bleaching Chemicals: Chlorine Dioxide, p. 61-69.

In one kind of processes the reaction medium is maintained in a single reaction vessel under boiling conditions at sub-atmospheric pressure, wherein alkali metal salt of the acid is precipitated and withdrawn as a salt cake. Examples of such processes are described in U.S. Pat. Nos. 5,091,166, 5,091,167, 5,366,714 and 5,770,171, and in WO 2006/062455. The salt cake may also be washed with water or another solvent, as described in e.g. U.S. Pat. Nos. 5,674,466 and 6,585,950.

In another kind of processes the reaction medium is maintained under non-crystallising conditions, generally at substantially atmospheric pressure. In most cases depleted reaction medium from a first reaction vessel is brought to a second reaction vessel for further reactions to produce chlorine dioxide. Depleted reaction medium withdrawn from the final reaction vessel, usually referred to as residual acid, contains acid, alkali metal salt of the acid and normally some unreacted alkali metal chlorate. The residual acid may sometimes, at least partly, be used in the pulping process. Examples of non-crystallising chlorine dioxide generation processes are described in EP 612686, WO 2006/033609, JP 03-115102 and JP 88-008203.

It has also been disclosed to treat depleted reaction medium or dissolved salt cake electrochemically, as described in e.g. U.S. Pat. Nos. 4,129,484, 5,478,446, 5,487,881, 5,858,322 and 6,322,690.

The modern commercial processes for chlorine dioxide production are highly efficient and only very small amounts of unwanted by-products, such as elemental chlorine, are generated. By the presence of elemental chlorine, also chlorinated aromatic compounds, such as chlorinated dibenzo-p-dioxins or dibenzo-furans, may exist in one or more process streams. Although the amounts thereof are extremely low, the high toxicity of some chlorinated aromatic compounds renders it desirable to reduce the content thereof to as high extent as possible.

The origin of the chlorinated aromatic compounds is not clear. Although such compound may exist already in the raw materials, it can be suspected that at least some may be formed in the chlorine dioxide generation process.

WO 2008/085122 discloses treating reaction medium or process streams in a chlorine dioxide production process with an adsorbent efficient for removing chlorinated organic compounds. Even though good results have been achieved, the method requires handling and destruction or re-generation of an adsorbent saturated with potentially toxic compounds.

It is an object of the invention to provide a simple method for reducing the amount of chlorinated aromatic compounds occurring in a process for the production of chlorine dioxide.

According to the invention, this object has been achieved by the addition of chlorine dioxide to one or more of the raw materials used in the process.

Thus, one aspect of the present invention concerns a preferably continuous process for the production of chlorine dioxide comprising forming chlorine dioxide in a reaction medium in a reaction vessel and withdrawing chlorine dioxide as a gas from the reaction medium in the reaction vessel, the process further comprising adding chlorine dioxide to at least one raw material used in the process. The chlorine dioxide withdrawn from the reaction medium may subsequently be absorbed into water, but may also be used as a gas.

Another aspect of the invention concerns use of chlorine dioxide for the reduction of the amount of chlorinated aromatic compounds occurring in a process for the production of chlorine dioxide. This aspect may also be expressed as a process for the reduction of the amount of chlorinated aromatic compounds occurring in a process of producing chlorine dioxide, comprising adding chlorine dioxide to at least one raw material for the process of producing chlorine dioxide.

Although the mechanism is not fully clear, it is believed that the chlorine dioxide oxidises aromatic contaminants in the raw materials to non-aromatic compounds. As a result, the amount of aromatic compounds that can be chlorinated and/or already chlorinated aromatic compounds in the raw materials will be reduced.

Examples of chlorinated aromatic compounds, the amount of which may be reduced by the present invention, include chlorinated dibenzo-p-dioxins (PCDD) and dibenzo-furans (PCDF). Specific examples of such compounds include dibenzo-p-dioxins chlorinated in the positions 2,3,7,8; 1,2,3,7,8; 1,2,3,4,7,8; 1,2,3,6,7,8; 1,2,3,7,8,9 and 1,2,3,4,6,7,8; and dibenzo-furans chlorinated in the positions 2,3,7,8; 1,2,3,7,8; 2,3,4,7,8; 1,2,3,4,7,8; 1,2,3,6,7,8; 2,3,4,6,7,8; 1,2,3,7,8,9 and 1,2,3,4,6,7,8; and 1,2,3,4,7,8,9.

Raw materials in a chlorine dioxide production process may include chlorate ions and at least one reducing agent. The raw materials may also include one or more of at least one acid and water. The chlorate ions may, for example, be in the form of alkali metal chlorate, such as sodium chlorate, or chloric acid, or a mixture of alkali metal chlorate and chloric acid. The reducing agent may, for example, be one or more of methanol, hydrogen peroxide, chloride ions and sulfur dioxide. The acid is preferably one or more mineral acid, such as sulfuric acid, hydrochloric acid, chloric acid and mixtures thereof. If chloric acid is used, it serves both as an acid and a source of chlorate ions. If hydrochloric acid is used, it serves both as a reducing agent and an acid. Water may be used for dissolving solid alkali metal chlorate to provide an aqueous solution thereof for feeding to the reaction medium. Water may also be fed directly to the reaction medium or be used for absorbing chlorine dioxide formed in the process. Water used for different purposes may come from the same or from different original sources.

Any of the above raw materials may contain aromatic contaminants and, according to the invention, chlorine dioxide may be added to one or more of them. The chlorine dioxide is preferably added as an aqueous solution of any concentrations, for example from about 1 mg/l to about 16 g/l or from about 1 g/l to about 10 g/l. Preferably, the chlorine dioxide is added in an amount to obtain an effective concentration thereof in the raw material, for example at least 0.1 mg/l. There is no critical upper limit, although it may be less economic having large amount of chlorine dioxide circulating in the process. From a practical point, a suitable concentration may be from about 1 mg/l to about 3 g/l, preferably from about 1 mg/l to about 1.5 g/l or from about 10 mg/l to about 100 mg/l. The chlorine dioxide may be added to a storage tank for the raw material or continuously to a stream of the raw material and may be mixed in-line, for example in a static mixer. The temperature of the raw material to which the chlorine dioxide is added is not critical, although it is preferred that it at some stage before being used in the process is brought to a temperature from about 5 to about 100° C. or from about 20 to about 80° C. The efficiency will increase with higher temperature but for practical reasons the addition of chlorine dioxide can be done at ambient temperature, for example from about 0 to about 45° C. The time between the addition of chlorine dioxide and when the raw material is used in the process may, for example, be from about 1 s to about 10 days or more, or from about 1 min to about 3 days.

As the chlorine dioxide also may react with inorganic contaminants in the raw materials, these may be filtered off before the raw material is used in the chlorine dioxide production process.

In an embodiment of the invention chlorine dioxide is added to water used for dissolving solid alkali metal chlorate or to an aqueous solution of alkali metal chlorate. For example, chlorine dioxide may be added to incoming water that before or after the addition of chlorine dioxide is brought to a temperature suitable for dissolving alkali metal chlorate, e.g. from about 25 to about 100° C. or from about 50 to about 90° C. The water may then be brought into contact with solid alkali metal chlorate to form a solution thereof, e.g. with a concentration from about 400 to saturation (usually about 760 g/l) or from about 600 to about 720 g/l. It is possible to operate within a wide pH range, for example from about 0 to about 14, but it is also possible to adjust the pH before, during or after adding the chlorine dioxide, for example to a pH from about 5 to about 13 or from about 8 to about 12.

In another embodiment chlorine dioxide is added to water fed directly to the reaction medium, which may be advantageous if alkali metal chlorate is fed as a solid material directly to the reaction medium. Also here it is possible to adjust the pH as specified above.

In another embodiment of the invention chlorine dioxide is added to water used for absorbing gaseous chlorine dioxide withdrawn from the reaction medium in which it has been formed. Also here it is possible to adjust the pH as specified above.

In further embodiments of the invention chlorine dioxide is added to one or more other raw materials, such as a reducing agent like hydrogen peroxide or an acid like sulfuric acid. One or more of the above embodiments may also be combined. For example, it is possible to add chlorine dioxide both to water for dissolution of alkali metal chlorate and to water for absorption of chlorine dioxide, as well as any other water optionally used in the process.

The invention is applicable in most kinds of chlorine dioxide generating processes, particularly those in which the chlorine dioxide is formed by reacting chlorate ions and a reducing agent in an acidic aqueous reaction medium, but also processes involving electrochemical reduction of chlorate or processes based on other raw materials such as alkali metal chlorite. The processes include those described in the earlier mentioned publications and those used commercially such as SVP-LITE®, SVP-HP®, SVP®-SCW, SVP®-HCL, HP-A®, Mathieson, R2®, R3®, R3H®, R5®, R7®, R8®, R9®, R10®, R11®, R12™, R13™ and integrated chlorine dioxide/chlorate processes like R6® and others. Thus, the invention is applicable on single vessel processes operated at sub-atmospheric pressure and crystallising conditions, as well as processes operated at substantially atmospheric pressure and non-crystallising conditions.

In an embodiment of the invention the process is run under crystallising conditions. One mode of operating such a process is described below:

A reaction medium is maintained in a reaction vessel under sub-atmospheric pressure, usually from about 8 to about 80 kPa absolute. The reaction medium is circulated through a circulation conduit and a heater (commonly called "reboiler") and back to the reaction vessel at a rate sufficient for keeping the temperature of the reaction medium at the boiling point, usually from about 15 to about 100° C., depending on the pressure. Feed streams of aqueous sodium chlorate, an acid like sulfuric acid or hydrochloric acid and a reducing agent like methanol, hydrogen peroxide, sodium chloride or hydrochloric acid are fed to various points of the circulation conduit, but may, if appropriate, also be fed directly to the reaction vessel. It is also possible to pre-mix one or more of the feed streams. The concentration of chlorate maintained in the reaction medium may vary within wide limits, for example from about 0.25 moles/liter up to saturation. The acidity of the reaction medium is preferably maintained from about 0.5 to about 12 N. In the reaction medium sodium chlorate, reducing agent and the acid react to form chlorine dioxide, sodium salt of the acid (e.g. sodium sulfate) and optionally other by-products, depending on the reducing agent used. Chlorine dioxide and other gaseous products are withdrawn as a gas together with evaporated water. Sodium salt of the acid precipitates as a substantially neutral or acidic salt, depending on the acidity of the reaction medium, and is withdrawn as a salt cake, (e.g. $Na_2SO_4$ (s) or $Na_3H(SO_4)_2$ (s)), by circulating reaction medium through a filter. The gas withdrawn from the reaction vessel is brought to a cooler and then an absorber supplied with chilled water dissolving the chlorine dioxide to form chlorine dioxide water while non-dissolved gaseous components are withdrawn as gas. Chlorine dioxide may be added to one or more of the feed streams, water supplied to the absorber or water used for preparing aqueous sodium chlorate from solid sodium chloride. It is also possible to add chlorine dioxide to one or more storage tank for any of the above feed chemicals.

In another embodiment of the invention the process is run as a non-crystallising process. One mode of operating such a process is described below:

A primary reaction vessel holds a reaction medium at non-boiling conditions. Feed streams of aqueous sodium chlorate, sulfuric acid and a reducing agent like hydrogen peroxide enter the primary reaction vessel, separately or as mixtures of two or more thereof, while an inert gas like air is blown into the bottom. In the reaction medium sodium chlorate, reducing agent and acid react to form chlorine dioxide, sodium salt of the acid and optionally other by-products, depending on the reducing agent used. Chlorine dioxide and other gaseous products are withdrawn as a gas together with the inert gas. Depleted reaction medium is brought to a secondary reaction vessel also supplied with a feed stream of reducing agent and inert gas like air. Also here chlorine dioxide is produced in the reaction medium and is withdrawn with other gaseous products as a gas together with the inert gas, while depleted reaction medium is brought to a stripper supplied with inert gas like air to remove substantially all gas from the liquid. The absolute pressure maintained in the reaction vessels is preferably from about 50 to about 120 kPa, most preferably at substantially atmospheric pressure, and a preferred temperature is from about 30 to about 100° C. The acidity of the reaction medium in the reaction vessels is preferably maintained from about 4 to about 14 N. The concentration of alkali metal chlorate in the reaction medium in the first reaction vessel is preferably maintained from about 0.05 mole/liter to saturation, and in the second reaction vessel preferably from about 9 to about 75 mmoles/liter. The gas from the primary and secondary reaction vessels and the stripper is brought to an absorber operated as in a crystallising process. Chlorine dioxide may be added to one or more of the feed streams, water supplied to the absorber or water used for preparing aqueous sodium chlorate from solid sodium chlorate. It is also possible to add chlorine dioxide to one or more storage tank for any of the above feed chemicals.

The invention is further illustrated by means of the following example, which, however, should not be interpreted as a limitation of the invention. Unless otherwise stated, all parts and percentages refer to parts and percent by weight.

EXAMPLE

Two trials were performed in a laboratory chlorine dioxide generator. In the first trial untreated river water was used for making a starting reaction medium and a sodium chlorate feed solution. The generator was operated continuously at a pressure of 25 kPa and a temperature of 67° C. with hydrochloric acid as acid and hydrogen peroxide as reducing agent, a system giving substantial formation of elemental chlorine. The process was run for 6 hours and after cooling the reaction medium (including formed solid NaCl particles) was collected. The reactor was then thoroughly cleaned and tubes were exchanged before the second trial.

In the second trial, water taken at the same occasion from the same river as in the first trial, was pretreated by adding 5 ml of $ClO_2$-water (5 g $ClO_2$/l) to 2 liter of water, corresponding to an addition of 12 mg $ClO_2$ per liter of water. The water was then left in room temperature for about 16 hours. A new starting reaction medium and a sodium chlorate feed solution were then made from the $ClO_2$ treated water. The generator was then operated continuously for 6 hours under the same conditions as in the first trial and after cooling the reaction medium (including formed solid NaCl particles) was collected.

The two samples of reaction medium were analysed in respect of chlorinated dibenzo-p-dioxins and dibenzofurans. The results, expressed as toxic equivalents of 2,3,7,8-tetrachlorodibenzo-p-dioxin, are shown in the table below:

|  | I-TEQ Lower bound (pg/kg) | I-TEQ 2005 Higher bound (pg/kg) |
|---|---|---|
| Reaction medium from trial 1 with untreated water | 6.8 | 7.1 |
| Reaction medium from trial 2 with $ClO_2$ treated water | 2.9 | 3.7 |

The results, expressed as the sum of all PCDD and PCDF congeners with 4 chlorine atoms or more, are shown in the table below:

|  | Reaction medium from trial 1 with untreated water (pg/kg) | Reaction medium from trial 2 with $ClO_2$ treated water (pg/kg) |
|---|---|---|
| Sum PCDD | 15 | 5.5 |
| Sum PCDF | 140 | 77 |

The results for the 17 most toxic congeners are shown in the following table:

| Congener | Reaction medium from trial 1 with untreated water (pg/kg) | Reaction medium from trial 2 with $ClO_2$ treated water (pg/kg) |
|---|---|---|
| 2378 TeCDD | 0.69 | ND(0.34) |
| 12378 PeCDD | ND(0.36) | ND(0.42) |
| 123478 HxCDD | ND(0.61) | ND(0.71) |
| 123678 HxCDD | ND(0.34) | ND(0.4) |
| 123789 HxCDD | ND(0.49) | ND(0.58) |
| 1234678 HpCDD | ND(0.53) | ND(0.66) |
| OCDD | ND(0.72) | ND(1) |
| 2378 TeCDF | 41 | 22 |
| 12378 PeCDF | 4.6 | 1.8 |
| 23478 PeCDF | 2.6 | 0.98 |
| 123478 HxCDF | 2.1 | 0.91 |
| 123678 HxCDF | 0.58 | 0.43 |
| 234678 HxCDF | 0.67 | 0.52 |
| 123789 HxCDF | 1.4 | ND(0.49) |
| 1234678 HpCDF | 1.4 | 0.85 |
| 1234789 HpCDF | ND(0.39) | ND(0.51) |
| OCDF | ND(1.1) | ND(1.6) |

ND(X.XX) is a notation that the concentration is below the detection limit, the X.XX in the parenthesis is the detection limit (LOD).

As apparent from the above results the amount of PCDD and PCDF could be significantly reduced by operating the process according to the invention.

What is claimed is:
1. A process for reducing the amount of chlorinated aromatic compounds in the reaction of chlorate ions and a reducing agent in an acidic aqueous reaction medium to form chlorine dioxide, the process consisting of adding chlorine dioxide to at least one raw material used in said reaction, wherein the at least one raw material includes water, an aqueous solution of an alkali metal chlorate, a reducing agent, or at least one mineral acid.
2. The process as claimed in claim 1, wherein said water includes water used for dissolving the alkali metal chlorate to form the aqueous solution thereof.
3. The process as claimed in claim 1, wherein said water includes water used for absorbing gaseous chlorine dioxide formed in the process.
4. The process as claimed in claim 1, wherein said at least one mineral acid is sulfuric acid.
5. The process as claimed in claim 1, wherein said at least one mineral acid is hydrochloric acid.

6. The process as claimed in claim 1, wherein the chlorine dioxide is added to said at least one raw material as an aqueous solution.

7. The process as claimed in claim 1, wherein the chlorine dioxide is added to said at least one raw material in an amount to obtain a concentration thereof in the raw material from about 1 mg/l to about 1.5 g/l.

8. The process as claimed in claim 1, wherein the chlorine dioxide is added to and mixed in-line with said at least one raw material.

9. The process as claimed in claim 1, wherein the at least one raw material to which chlorine dioxide has been added at some stage before being used in the reaction is brought to a temperature from about 5 to about 100° C.

10. The process according to claim 1 wherein the chlorinated aromatic compounds are chlorinated aromatic dibenzo-p-dioxin and dibenzo-furan.

11. The process as claimed in claim 2, wherein said at least one raw material includes the reducing agent.

12. The process as claimed in claim 1, wherein said at least one raw material includes the at least one mineral acid and the aqueous solution of the alkali metal chlorate.

13. The process as claimed in claim 12, wherein said at least one mineral acid is sulfuric acid.

14. The process as claimed in claim 3, wherein the chlorine dioxide is added to said at least one raw material in an amount to obtain a concentration thereof in the raw material from about 1 mg/l to about 1.5 g/l.

15. The process as claimed in claim 6, wherein the chlorine dioxide is added to said at least one raw material in an amount to obtain a concentration thereof in the raw material from about 1 mg/l to about 1.5 g/l.

16. The process as claimed in claim 6, wherein the chlorine dioxide is added to and mixed in-line with said at least one raw material.

\* \* \* \* \*